(12) United States Patent
Hauenschild et al.

(10) Patent No.: US 9,136,948 B2
(45) Date of Patent: Sep. 15, 2015

(54) ELECTRICAL MODULATOR DRIVER CIRCUIT FOR GENERATING MULTI-LEVEL DRIVE SIGNALS FOR QAM OPTICAL TRANSMISSION

(75) Inventors: Juergen Hauenschild, Bochum (DE); Chris Fludger, Nuremberg (DE); Thomas Duthel, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 958 days.

(21) Appl. No.: 13/191,642

(22) Filed: Jul. 27, 2011

(65) Prior Publication Data

US 2013/0027763 A1 Jan. 31, 2013

(51) Int. Cl.
| | |
|---|---|
| H04B 10/04 | (2006.01) |
| H04B 10/54 | (2013.01) |
| H04L 27/20 | (2006.01) |
| H04L 27/34 | (2006.01) |
| H04L 27/02 | (2006.01) |

(52) U.S. Cl.
CPC .......... H04B 10/541 (2013.01); H04L 27/2096 (2013.01); H04L 27/34 (2013.01); H04L 27/02 (2013.01)

(58) Field of Classification Search
CPC .. H04L 27/20; H04B 10/505; H04B 10/5561; H04B 10/541; H04B 10/532; G02F 1/0123; G02F 1/225
See application file for complete search history.

(56) References Cited

U.S. PATENT DOCUMENTS

| | | | | |
|---|---|---|---|---|
| 3,956,624 A | * | 5/1976 | Audaire et al. | 708/835 |
| 4,264,896 A | * | 4/1981 | Sakarya et al. | 398/15 |
| 6,842,073 B2 | * | 1/2005 | Den Besten | 330/261 |
| 2002/0167693 A1 | * | 11/2002 | Vrazel et al. | 359/109 |
| 2003/0020144 A1 | * | 1/2003 | Warble et al. | 257/647 |
| 2004/0190911 A1 | | 9/2004 | Franco et al. | |
| 2009/0015336 A1 | * | 1/2009 | Aoki et al. | 330/285 |
| 2009/0092396 A1 | * | 4/2009 | Lyubomirsky | 398/89 |
| 2009/0324253 A1 | * | 12/2009 | Winzer | 398/185 |

OTHER PUBLICATIONS

Technical Document created by OIF—Optical Internetworking Forum, "Implementation Agreement for Integrated Polarization Multiplexed Quadrature Modulated Transmitters," Mar. 12, 2010, IA # OIF-PMQ-TX-01.0.
P. J. Winzer et al., Spectrally Efficient Long-Haul Optical Networking Using 112-Gb/s Polarization-Multiplexed 16-QAM, Journal of Lightwave Technology, vol. 28, No. 4, Feb. 15, 2010.

* cited by examiner

*Primary Examiner* — Ken Vanderpuye
*Assistant Examiner* — David Lambert
(74) *Attorney, Agent, or Firm* — Edell, Shapiro & Finnan, LLC (57) ABSTRACT

An apparatus and methods for generating multi-level output signals for use by an optical modulator are provided. The apparatus comprises a plurality of input signal lines each configured to receive a binary input signal, an output signal line and a plurality of amplifier stages. The amplifier stages are each connected between one of the input signal lines and the output signal line so as to each produce an output voltage on the output signal line of either a first level or a second level. The level of the output voltage is based on the binary signal at the respective input signal line, and the output voltages of the respective plurality of amplifier stages collectively produce a summed analog output voltage on the output signal line at two or more different levels each configured to drive an optical modulator.

29 Claims, 8 Drawing Sheets

ELECTRICAL MODULATOR DRIVER CIRCUIT FOR GENERATING MULTI-LEVEL DRIVE SIGNALS FOR QAM OPTICAL TRANSMISSION

TECHNICAL FIELD

The present disclosure relates to an electrical modulator driver circuit configured to generate multi-level drive signals for an optical modulator.

BACKGROUND

In recent years there has been increased use of optical fiber communication networks. Early fiber optic communication networks used transmission of one bit of information per data symbol. However, due to the need for high-capacity communications, there is an increasing demand for higher bit rates which has led to the use of higher order modulation schemes for transmissions. Modulation schemes that have been implemented include Quaternary Phase Shift Keying (QPSK) and M-Quadrature Amplitude Modulation (M-QAM), wherein M is an integer with the power of 2 (i.e., 2, 4, 8, 16, 32, 64, etc.). In such modulation schemes, one or more electrical drive signals are used by an optical modulator to generate an optical signal carrying data that is sent in an optical fiber.

DESCRIPTION OF EXAMPLE EMBODIMENTS

Overview

An apparatus and methods for generating multi-level drive signals for use by an optical modulator are provided. The apparatus comprises a plurality of input signal lines each configured to receive a binary input signal, an output signal line, and a plurality of amplifier stages. The amplifier stages are each connected between one of the plurality of input signal lines and the output signal line so as to produce, in response to an input signal, an associated forward traveling wave on the output signal line. Specifically, each stage generates an output voltage on the output signal line of either a first level or a second level. The level of the output voltage is based on the binary signal at the respective input signal line, and the output voltages of the respective plurality of amplifier stages collectively produce a summed output voltage on the output signal line at two or more different levels configured to drive an optical modulator.

Example Embodiments

Figure 1:
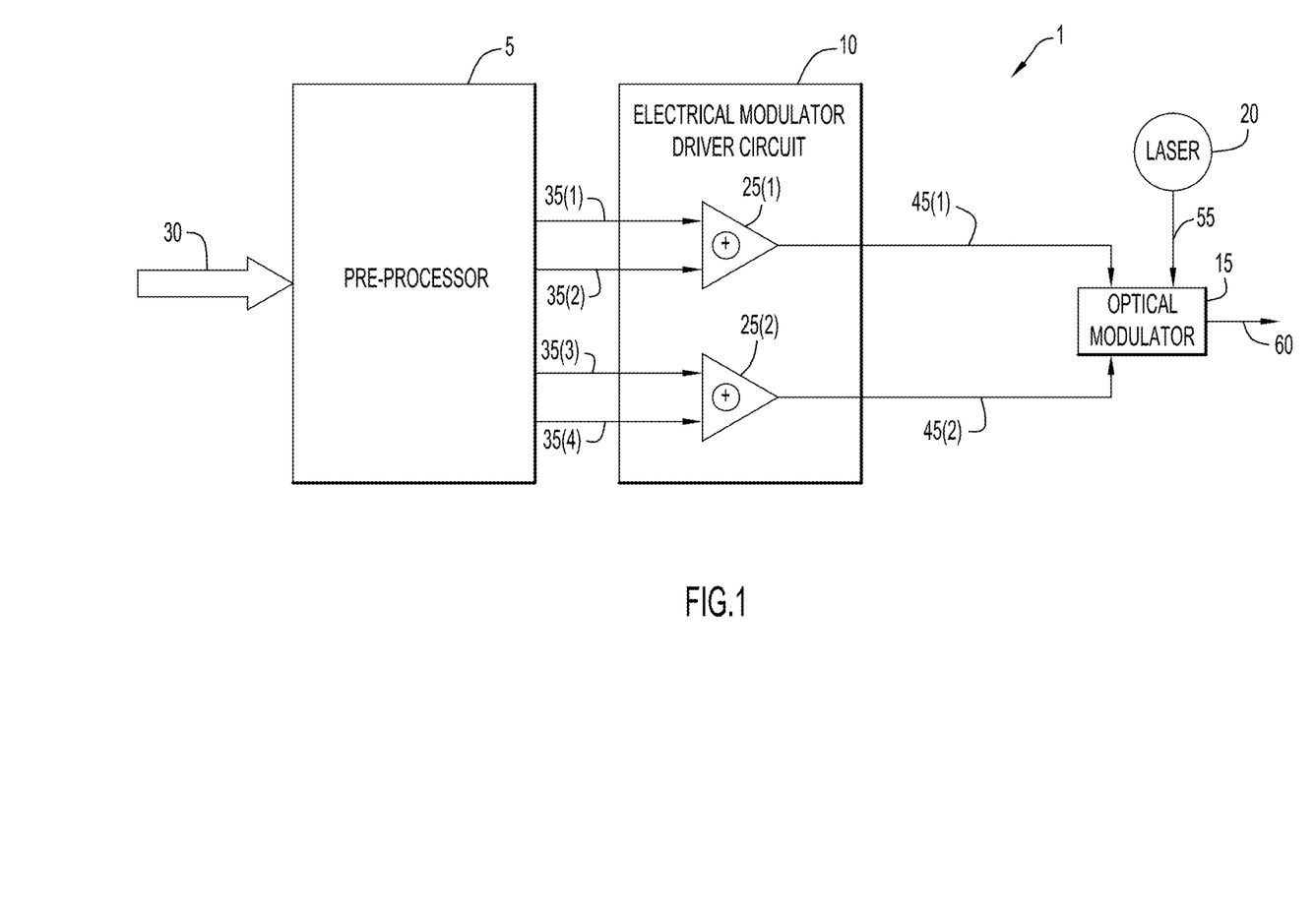
FIG. 1 is a block diagram of an optical transmitter having two modulator drivers (MDRs) each configured to generate multi-level drive signals for an optical modulator.

FIG. 1 is a block diagram of an optical transmitter 1 that may be implemented in accordance with concepts described herein. Optical transmitter 1 comprises a pre-processor 5, electrical modulator driver circuit 10, optical modulator 15, and a laser 20. Electrical modulator driver circuit 10 comprises two modulator drivers (MDRs) 25(1) and 25(2).

An electrical data signal 30 is received by pre-processor 5. Data signal 30 may be, for example, a 40 Gigabit (GB) or 100 GB signal transmitting 40 or 100 gigabits per second (Gbps), respectively. For ease of illustration, data signal 30 will be presumed to be a 100 Gbps data signal.

Pre-processor 5 is configured to perform any number of different operations, including data aggregation, pre-processing, encoding, etc., in order to convert electrical data input signal 30 into four digital binary signals 35(1)-35(4) each at, for example, 25 Gbps. As used herein, binary signals are signals that either have a high or low state, represented as a logic "1" or a "0", respectively.

Two of these digital binary signals, signals 35(1) and 35(2), are provided to first MDR 25(1), while the two remaining digital binary signals, signals 35(3) and 35(4), are provided to MDR 25(2). As described in greater detail below, each MDR 25(1) and 25(2) is configured to utilize its respective two binary inputs to generate independent multi-level drive signals for optical modulator 15. More specifically, MDR 25(1) generates a drive signal 45(1), while MDR 25(2) generates a drive signal 45(2).

Also as detailed below, multi-level drive signals 45(1) and 45(2) may be at one of four different voltage levels depending on the combination of its binary inputs. That is, MDRs 25(1) and 25(2) are configured such that the binary combination at its inputs ("00", "01", "10", or "11") controls the voltage level of its respective generated drive signal 45(1) or 45(2). As such, drive signals 45(1) and 45(2) are referred to herein as multi-level drive signals because they may be generated at one of a plurality of voltage levels. Moreover, these voltage levels are relatively high voltage levels suitable for driving an optical modulator.

As shown in FIG. 1, drive signals 45(1) and 45(2) are supplied to optical modulator 15. Optical modulator 15 uses drive signals 45(1) and 45(2) to modulate laser beam 55 generated by laser 20 into a modulated optical signal 60. In the example of FIG. 1, optical modulator 15 is configured to generate a 16-QAM optical signal 60 at 25 Gigabaud (Gbaud) with 4 bits per symbol. That is, the drive signals 45(1) and 45(2) are used by optical modulator 15 to generate an optical signal carrying data that is sent in an optical fiber.

The examples of FIG. 1, as well as the following examples, refer to configurations in which one optical modulator is fed by two independent driver instances. As noted above, these example configurations may used to generate, for example, 16-QAM. It is to be appreciated that aspects described herein may be implemented in other configurations using different numbers of MDRs. For example, aspects may be implemented in a configuration using one MDR with a different modulator type to generate, for example, 4-Amplitude-shift keying (4-ASK).

As described below, the modulator drivers 25(1) and 25(2) receive digital inputs (signals 35(1) and 35(2) and signals 35(3) and 35(4)), respectively, and generate an analog output (drive signals 45(1) and 45(2)) at multiple voltage levels. As such, modulator drivers 25(1) and 25(2) are configured to perform digital-to-analog conversion and are each referred to as a modulator driver-analog-to-digital converter (MDR-DAC).

Figure 2:
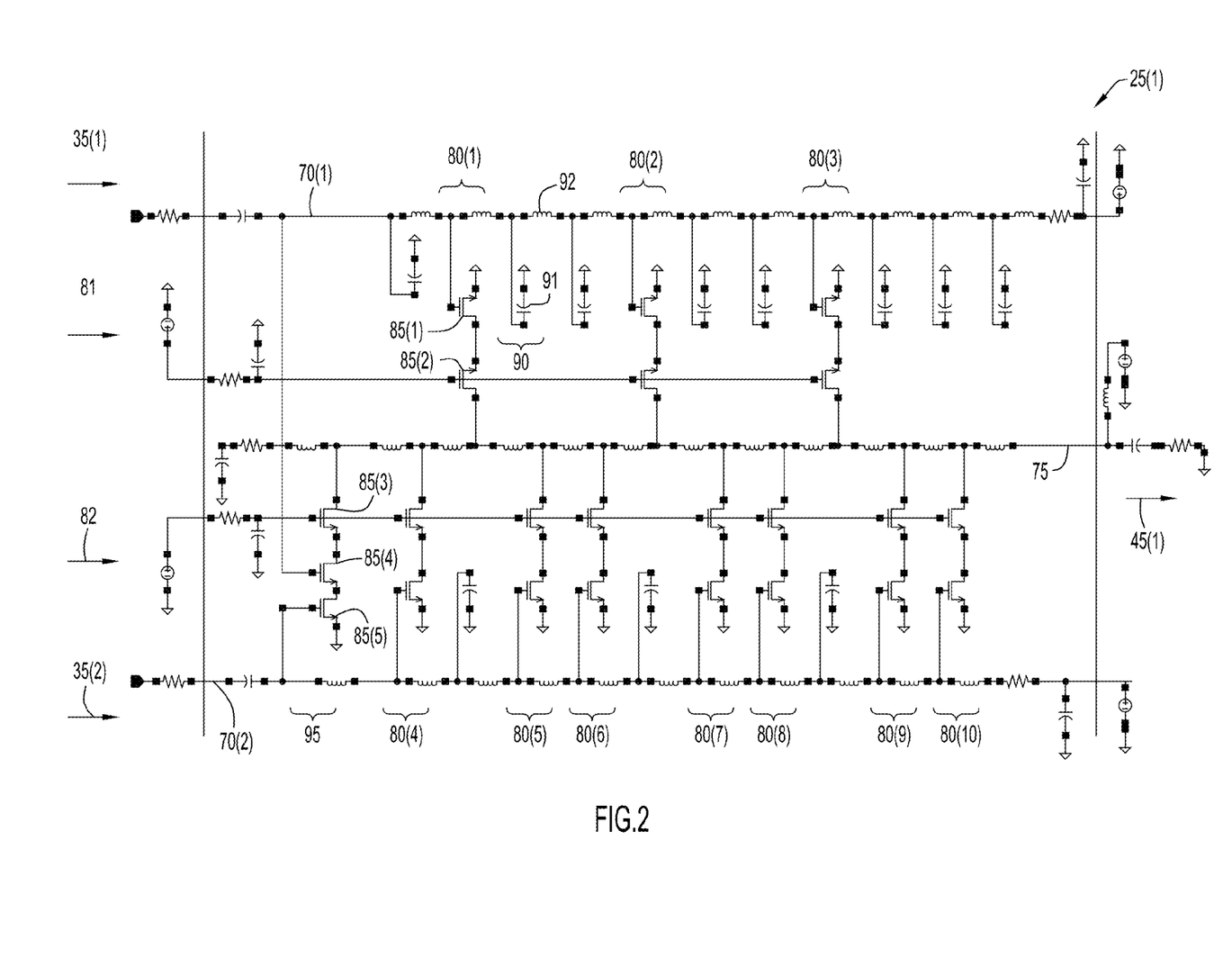
FIG. 2 is a schematic diagram of an example MDR configured to generate multi-level drive signals for an optical modulator.

FIG. 2 is a schematic diagram of one example of MDR 25(1) of FIG. 1. In this example, MDR 25(1) has a first signal input line 70(1), a second input line 70(2), an output line 75, and a plurality of amplifier stages 80(1)-80(10). It is to be appreciated that MDR 25(2) of FIG. 1 may be implemented in substantially the same manner as MDR 25(1).

In the example of FIG. 2, each amplifier stage 80(1)-80(10) is connected between output signal line 75 and either input signal line 70(1) or input signal line 70(2). More particularly, a first group or plurality of amplifier stages (stages 80(1)-80(3)) are connected in parallel between first input signal line 70(1) and output signal line 75, while a second plurality of amplifier stages (80(4)-80(10)) are connected in parallel between second input signal line 70(2) and output signal line 75. The first plurality of amplifier stages 80(1)-80(3) is shown at 81, while the second plurality of amplifier stages 80(4)-80(10) is shown at 82.

In one example, each amplifier stage 80(1)-80(10) comprises two transistors that, as described below, use the digital binary input to produce a voltage at output line 75. The two transistors are shown at 85(1) and 85(2) in amplifier stage 80(1), and the other amplifier stages are similarly configured, but for simplicity, their transistors are not labeled. Amplifier stages 80(1)-80(10) are power amplifier stages each configured to convert a low voltage signal received at its respective input into a substantially higher voltage signal at output signal line 75.

As shown in FIG. 2, first input line 70(1) receives signal 35(1) from pre-processor 5, while second input line 70(2) receives signal 35(2) from the pre-processor. As noted above, each signal 35(1) and 35(2) is a digital binary input signal having either a high value ("1"), or a low value ("0"). Each amplifier stage 80(1)-80(10) is configured to generate or produce, at output signal line 75, an output voltage having either a first or a second level. The first or second voltage level produced by an amplifier stage 80(1)-80(10) is based on the value of the digital input at the input signal line of the amplifier stage. More specifically, if the binary value of the input signal is a "1", an amplifier stage is active and will produce the first voltage level at output signal line 75. An input signal is at high level ("1") when it is at an input level causing an amplifier stage to contribute a voltage greater than zero to the output voltage at signal line 75. If the binary value of the input signal is a "0", an amplifier stage is non-active and will produce the second voltage level at output signal line 75. An input signal is a low level ("0") when it is at an input level that does not cause the amplifier stage to contribute to the output voltage at output signal line 75. It should be understood that an inverse of this configuration may be possible.

The first voltage level at the output of amplifier stages 80(1)-80(10) is a voltage level greater than 0V and may be, for example, approximately 0.5V, 1V, etc. The actual voltage value may be determined based on the requirements of optical modulator 15. The second voltage level the output of amplifier stages 80(1)-80(10) is approximately 0V. The summation of the total voltages produced by each stage 80(1)-80(10) produces the voltage of drive signal 45(1) that is delivered to optical modulator 15.

In the example arrangement of FIG. 2, three stages (stages 80(1)-80(3)) are connected in parallel between first input signal line 70(1) and output signal line 75, while seven amplifier stages (80(4)-80(10)) are connected in parallel between second input signal line 70(2) and output signal line 75. Assuming, for illustration purposes, each amplifier stage is configured to produce a 1V output at output signal line 75, the first plurality of stages associated with the first signal line 70(1) (stages 80(1)-80(3)) will collectively produce a 3V swing at the output signal 75, while the second plurality of stages associated with the second signal line 70(2) (stages 80(4)-80(10)) will collectively produce a 7V swing at the output signal line.

More specifically, if input signal 35(1) is a "1", stages 80(1)-80(3) will each contribute 1V to drive signal 45(1). However, if input signal 35(1) is a "0", stages 80(1)-80(3) will each contribute 0V to drive signal 45(1). Thus, stages 80(1)-80(3) can contribute either 0V or 3V to the drive signal 45(1). Similarly, if input signal 35(2) is a "1", stages 80(4)-80(10) will also each contribute 1V to drive signal 45(1). If input signal 35(2) is a "0", stages 80(4)-80(10) will each contribute 0V to drive signal 45(1). Thus, stages 80(4)-80(10) can contribute either 0V or 7V to the output signal 45(1).

In the arrangement of FIG. 2, signals 35(1) and 35(2) may each be considered to represent a single bit of a two bit binary number. Signal 35(2) is considered the most significant bit (MSB) of this number, while signal 35(1) is the least significant bit (LSB). Table 1, below, illustrates the possible binary combinations of input signals 35(1) and 35(2) and the resulting voltage of output signal 45(1).

TABLE 1

| Second Input Signal 35(2) (Binary Value) | First Input Signal 35(1) (Binary Value) | Drive Signal 45(1) (Volts) |
| --- | --- | --- |
| 0 | 0 | 0 |
| 0 | 1 | 3 |
| 1 | 0 | 7 |
| 1 | 1 | 10 |

As the input signals 35(1) and 35(2) propagate down respective input lines 70(1) and 70(2), the individual amplifier stages 80(1)-80(10) respond to the forward traveling input signals by producing an associated forward traveling wave on the output line. In order for proper operation, the delays of the input lines 70(1) and 70(2) and output line 75 are such that the contributions from each individual amplifier stage 80(1)-80(10) will be summed in order and in phase. The alignment of these delays is facilitated by delay circuits 90 on input signal lines 70(1) and 70(2). Delay circuits 90 comprise one or more capacitors 91 and one or more inductors 92 each having characteristics selected to produce the desired delay amount. The number of delay circuits on each of input signal line 70(1) and 70(2) may vary depending on the implemented configuration. For ease of illustration, only one instance of delay circuit 90 is labeled in FIG. 2.

The number of stages associated with each input signal line is correlated with the desired voltage levels of output signal 45(1). The example arrangement of FIG. 2 produces four (4) different voltage levels (0V, 3V, 7V and 10V) at output signal line 75. If different voltage levels are desired, a greater or lesser number of stages may be associated with each input signal line 70(1) and 70(2). For example, it may be desirable to produce output voltage levels of 0V, 4V, 8V, and 12V. In such circumstances, assuming each amplifier stage produces 1V at the output signal line 75, four amplifier stages would be associated with input signal line 70(1) (i.e., amplifier group 81 would include four amplifier stages), while eight amplifier stages would be associated with input signal line 70(2) (i.e., amplifier group 82 would include eight amplifier stages).

The desired output voltage levels, and hence number of amplifier stages associated with each input signal line 70(1) and 70(2), may be based on, for example, the requirements of optical modulator 15. However, in order to obtain the four different voltage levels, the number of amplifier stages associated with input signal line 70(1) should be different than the number of amplifier stages associated with input signal line 70(2).

Implementations described herein are not limited to any specific number of stages or configurations. As such, the use of three stages (stages 80(1)-80(3)) to produce a 3V swing at the output signal 75, as well as the use of seven stages (stages 80(4)-80(10)) to provide a 7V swing at output 75, are merely examples. Different numbers of stages may be used in different desired configurations.

In certain circumstances, when both binary input signals 35(1) and 35(2) are high (i.e., both "1"), MDR 25(1) will result in a non-linear transfer function at the output. As such, MDR 25(1) further comprises a compensation stage 95 configured to linearize the summed output voltage at signal line 75. Compensation stage 95 comprises three transistors 85(3)-85(5) coupled between both of first and second input signal lines 70(1) and 70(2) and the output signal line 75. The compensation stage 95 is a not-AND (NAND)-like arrangement that is driven by both input signals 35(1) and 35(2).

MDRs 25(1) and 25(2) may be implemented on the same or different integrated circuit devices. As such, in one example implementation, multiple instances of the MDRs described herein may be implemented on the same integrated circuit device.

FIG. 2 illustrates an example in which it is assumed each amplifier stage generates one volt at output signal line 75, resulting in voltages levels of 0V, 3V, 7V, and 10V. It is to be appreciated that the voltage levels of signals 35(1) and 35(2) are substantially less than the voltages of drive signal 45(1). For example, in certain circumstances the voltage level that is generated for a "1" at input signal lines 70(1) and 70(2) may be less than 1V, such as a few hundred mV.

Figure 3:
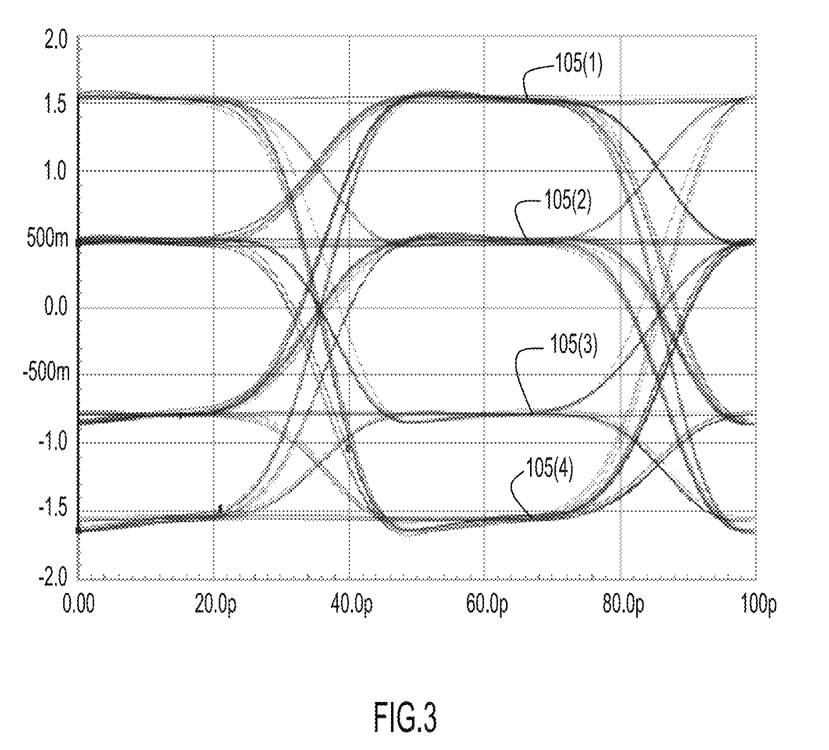
FIG. 3 is a diagram illustrating example output signal levels generated by an MDR shown in FIG. 2.

FIG. 3 is a diagram schematically illustrating examples of drive signal 45(1). That is, FIG. 3 shows the four possible levels 105(1)-105(4) of drive signal 45(1).

Figure 4:
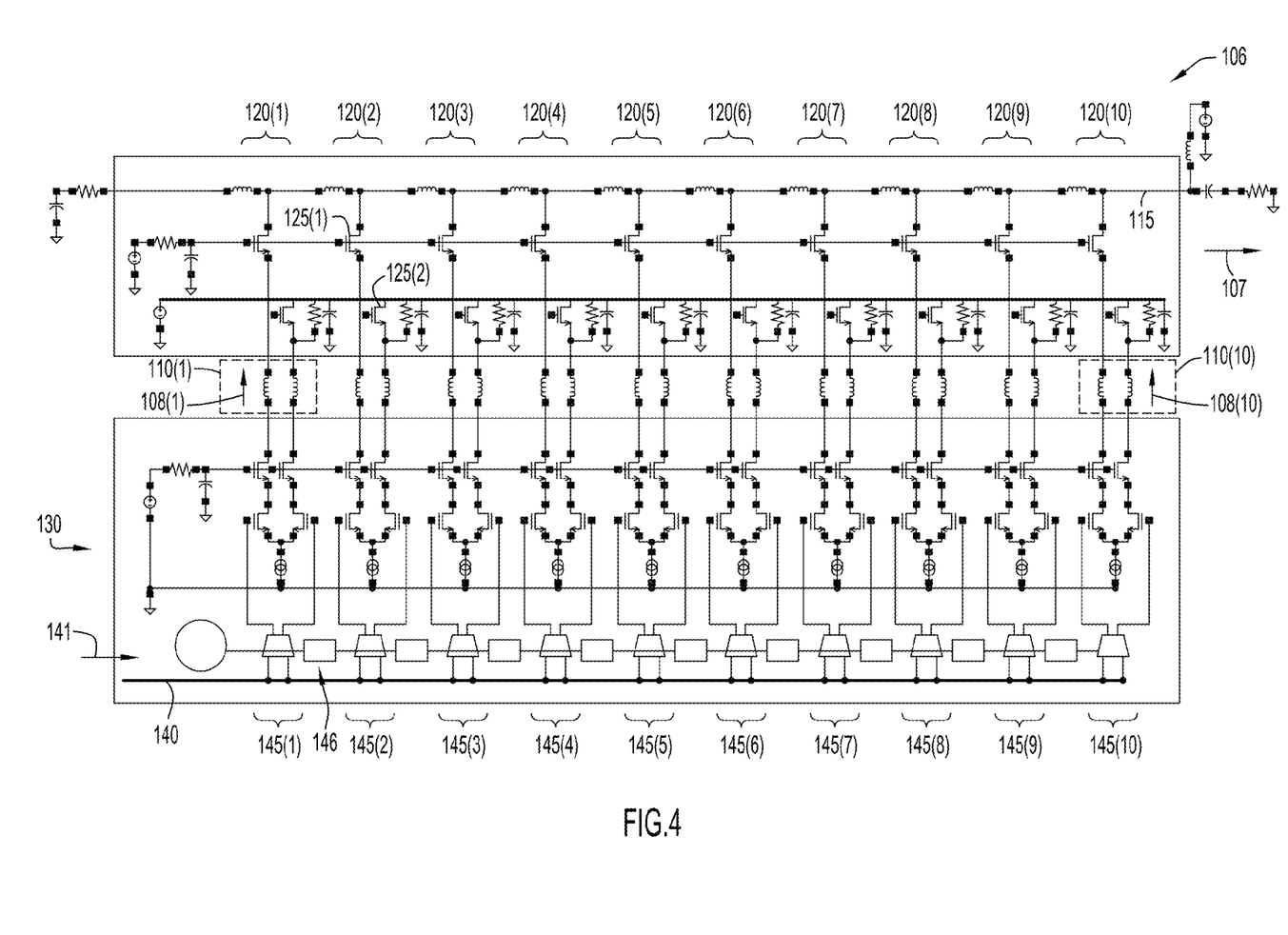
FIG. 4 is a schematic diagram of another example MDR configured to generate multi-level drive signals for an optical modulator.

FIG. 4 illustrates another example of an MDR 106 that may also be used to generate a four-level drive signal as described above. However, as detailed below, the example MDR 106 of FIG. 4 has the further ability to generate more than four output levels, thereby allowing for more complex manipulations of the generated signal. More specifically, FIG. 4 has the ability to generate, using ten separate digital binary input signals 108(1)-108(10), a multi-level drive signal 107 having ten different voltage levels greater than zero. MDR 106 includes a plurality of independent input signal lines 110(1)-110(10), an output signal line 115, a plurality of amplifier stages 120(1)-120(10) and a control circuit 130.

For ease of illustration, only two input signal lines 110(1) and 110(10), and their respective digital binary input signals 108(1) and 108(10) are labeled in FIG. 4. As described below, control circuit 130 may be implemented in the same integrated circuit package as the plurality of amplifier stages 120(1)-120(10).

In the example of FIG. 4, each amplifier stage 120(1)-120(10) is connected between a corresponding one of the input signal lines 110(1)-110(10) and output signal line 115. That is, stages 120(1)-120(10) are in parallel, but each has a different input signal line. Each amplifier stage 120(1)-120(10) also comprises two transistors that, as described below, use the binary input to produce a voltage at output line 115. For ease of illustration, only the transistors 125(1) and 125(2) in amplifier stage 120(2) are labeled in FIG. 4. Amplifier stages 120(1)-120(10) are power amplifier stages each configured to convert a low voltage signal received at its respective input into a substantially higher voltage signal at output signal line 115.

In the arrangement of FIG. 4, each input line 110(1)-110(10) receives a respective digital binary input signal 108(1)-108(10) from a control circuit 130, described further below. Each signal 108(1)-108(10) is a digital binary input signal having a high value ("1"), or a low value ("0"). Each amplifier stage 120(1)-120(10) is configured to generate or produce, at output signal line 115, an output voltage having either a first or a second level. The first or second level produced by an amplifier stage is based on the value of the digital input at the input signal line of the amplifier stage. More specifically, if the binary value of the input signal is a "1", an amplifier stage will produce the first voltage level at output signal line 115. An input signal is at high level ("1") when it is at an input level causing an amplifier stage to contribute a voltage greater than zero to the output level at signal line 115. If the binary value of the input signal is a "0", an amplifier stage will produce the second voltage level at output signal line 115. An input signal is a low level ("0") when it is at an input level that does not cause the amplifier stage to contribute voltage to the output level at signal line 115.

The first voltage level at the output of amplifier stages 120(1)-120(10) is a voltage level greater than 0V and may be, for example, approximately 0.5V, 1V, etc. The actual voltage value may be determined based on the requirements of an optical modulator connected to output signal line 115. The second voltage level at the output of amplifier stages 120(1)-120(10) is approximately 0V. The summation of the total voltages produced by each stage 120(1)-120(10) is the voltage of signal 107.

As noted above, digital binary input signals 108(1)-108(10) are received from a control circuit 130 and, as such, signals 108(1)-108(10) are outputs of the control circuit. Control circuit 130 includes an input signal line 140 and a plurality of parallel logic stages 145(1)-145(10) connected in between input signal line 140 and signal lines 110(1)-110(10). In other words, logic stages 145(1)-145(10) are parallel stages with the same input, but that terminate at different signal lines.

In operation, a multi-bit binary signal 141 is received at signal line 140. Logic stages 145(1)-145(10) are each configured to use one bit of this input signal 141 to produce a corresponding binary signal 108(1)-108(10) at its associated signal line 110(1)-110(10). In other words, the binary value of signals 108(1)-108(10) correspond to a bit value of signal 141. As each amplifier stage is configured to produce substantially the same output voltage as the other stages, the characterization of one of the bits of signal 141 as the most significant bit (MSB), or other bits as the least significant bit (LSB), is not relevant. Rather, the number of high and low bits in signal 141, regardless of their relative position in the number, determines the output voltage level. For the purposes of the following example, signals 108(1)-108(10) will each be considered to be the bits of the ten bit number in the same order as shown. That is, signal 108(1) is the first bit, signal 108(2) is the second bit, and so on. It is also assumed, for illustration purposes, that each amplifier stage 120(1)-120(10) is configured to produce a 1V output at output signal line 115. Using these assumptions, Table 2, shown below, illustrates possible binary combinations of input signals 108(1)-

108(10) resulting from a binary signal 141, and the subsequently generated voltage of drive signal 107.

TABLE 2

| Input Signals (Binary Value) | | | | | | | | | | Drive Signal |
|---|---|---|---|---|---|---|---|---|---|---|
| 108 (1) | 108 (2) | 108 (3) | 108 (4) | 108 (5) | 108 (6) | 108 (7) | 108 (8) | 108 (9) | 108 (10) | (Volts) 107 |
| 0 | 0 | 0 | 0 | 0 | 0 | 0 | 0 | 0 | 0 | 0 |
| 0 | 0 | 0 | 0 | 0 | 0 | 0 | 0 | 0 | 1 | 1 |
| 0 | 0 | 0 | 0 | 0 | 0 | 0 | 0 | 1 | 1 | 2 |
| 0 | 0 | 0 | 0 | 0 | 0 | 0 | 1 | 1 | 1 | 3 |
| 0 | 0 | 0 | 0 | 0 | 0 | 1 | 1 | 1 | 1 | 4 |
| 0 | 0 | 0 | 0 | 0 | 1 | 1 | 1 | 1 | 1 | 5 |
| 0 | 0 | 0 | 0 | 1 | 1 | 1 | 1 | 1 | 1 | 6 |
| 0 | 0 | 0 | 1 | 1 | 1 | 1 | 1 | 1 | 1 | 7 |
| 0 | 0 | 1 | 1 | 1 | 1 | 1 | 1 | 1 | 1 | 8 |
| 0 | 1 | 1 | 1 | 1 | 1 | 1 | 1 | 1 | 1 | 9 |
| 1 | 1 | 1 | 1 | 1 | 1 | 1 | 1 | 1 | 1 | 10 |

Similarly, Table 3, shown below, illustrates example binary combinations that result in a four level drive signal as described above with reference to FIG. 2.

TABLE 3

| Input Signals (Binary Value) | | | | | | | | | | Drive Signal |
|---|---|---|---|---|---|---|---|---|---|---|
| 108 (1) | 108 (2) | 108 (3) | 108 (4) | 108 (5) | 108 (6) | 108 (7) | 108 (8) | 108 (9) | 108 (10) | (Volts) 107 |
| 0 | 0 | 0 | 0 | 0 | 0 | 0 | 0 | 0 | 0 | 0 |
| 1 | 1 | 1 | 0 | 0 | 0 | 0 | 0 | 0 | 0 | 3 |
| 1 | 1 | 1 | 1 | 1 | 1 | 1 | 0 | 0 | 0 | 7 |
| 1 | 1 | 1 | 1 | 1 | 1 | 1 | 1 | 1 | 1 | 10 |

It is to be appreciated that the above tables are only examples and that other combinations of binary signals are possible to generate different voltages in drive signal 107.

In order for proper operation, the delays in the circuit are such that the output signals from each individual amplifier stage 120(1)-120(10) will sum in order and in phase at the output signal line 115. The proper delays are facilitated by delay circuits 146 in control circuit 130. Specifically, each logic stage 145(1)-145(10) includes a delay circuit that will control the timing of signals 108(1)-108(10). For ease of illustration, only one instance of delay circuit 146 is labeled in FIG. 4.

FIG. 4 illustrates an example in which ten stages 120(1)-120(10) are connected in parallel between individual input signal lines 110(1)-110(10) and output signal line 115. It is to be appreciated that the number of stages of FIG. 4, and the resulting voltages at output signal line 115, are merely illustrative and that different numbers of stages and voltage levels may be used in alternative arrangements. If different voltage levels are desired, a greater or lesser number of stages may be provided. The desired output voltage levels, and hence number of amplifier stages, may be based on, for example, the requirements of an optical modulator or other device connected to output signal line 115.

Also as noted, FIG. 4 illustrates an example in which it is assumed each amplifier stage 120(1)-120(10) generates 1V at output signal line 115, resulting in 10 voltages levels greater than 0, including 1V, 2V, 3V, 4V, 5V, 6V, 7V, 8V, 9V and 10V. It is to be appreciated that the voltage levels of signals 108(1)-108(10) are substantially less than the voltages of drive signal 107. For example, in certain circumstances the voltage level that is considered to be a "1" at input signal lines 110(1)-110(10) may be less than 1V, such as a few hundred mV.

In the example of FIG. 4, control circuit 130 and the plurality of parallel amplifier stages 120(1)-120(10) may be implemented using different semiconductor technologies. For example, control circuit 130 may be implemented using a first semiconductor technology, e.g., digital complementary metal oxide semiconductor (CMOS) technology, while the amplifier stages are implemented using a second semiconductor technology configured to operate with higher voltages, such as, but not limited to, a Gallium arsenide (GaAs) semiconductor technology. As such, MDR 106 may be referred to as a hybrid circuit because it uses multiple semiconductor technologies in one integrated circuit package.

As noted above, modulator driver 106 receives a digital input (signal 140) and generates an analog output (drive signal 107) at multiple voltage levels. As such, modulator driver 106 is configured to perform digital-to-analog conversion and is referred to as a MDR-DAC.

In certain circumstances, multiple MDRs (such as MDR 106) may be utilized. These multiple MDRs may be implemented on the same or different integrated circuit devices. As such, in one example implementation, multiple instances of MDR 106 may be implemented on the same integrated circuit device.

Figure 5:
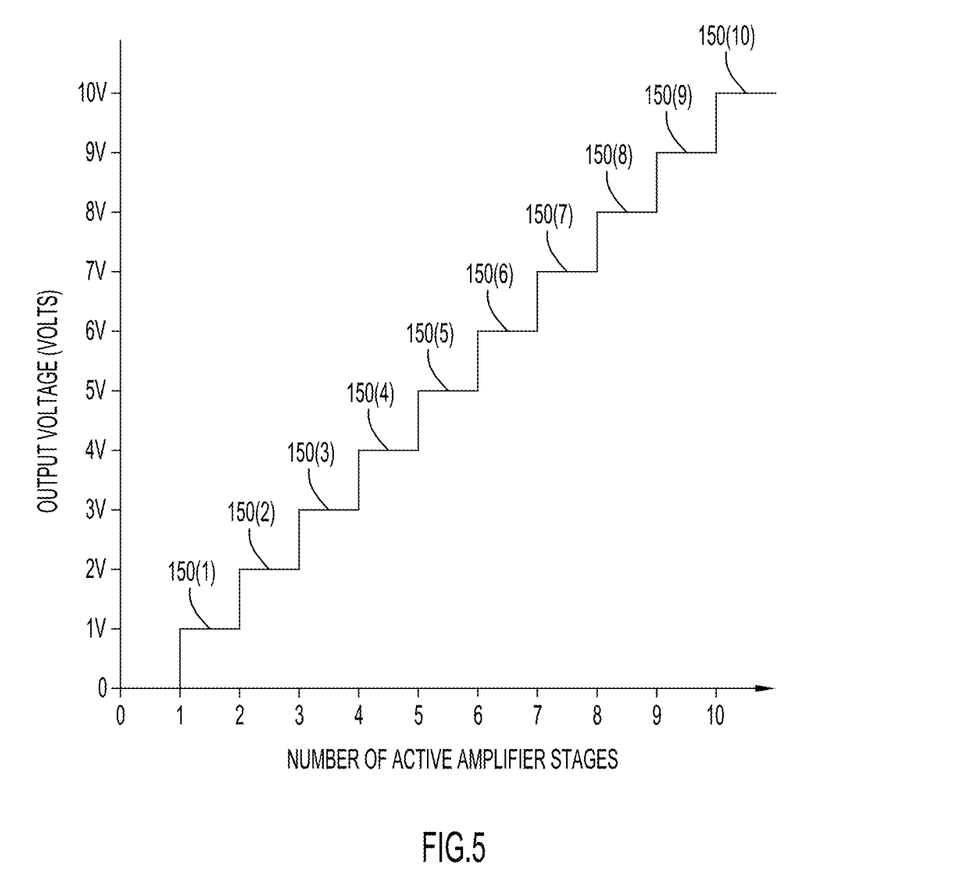
FIG. 5 is a graph schematically illustrating output signal levels generated by an MDR shown in FIG. 4.

FIG. 5 is a graph schematically illustrating the ten different levels of drive signal 107. That is, FIG. 5 shows the ten possible levels (greater than 0V) 150(1)-150(10) of drive signal 107 as a function of the number of active stages (i.e., stages receiving a high input). For the purposes of this example, it is assumed that each stage generates a voltage of 1V at output signal line 115.

Figure 6:
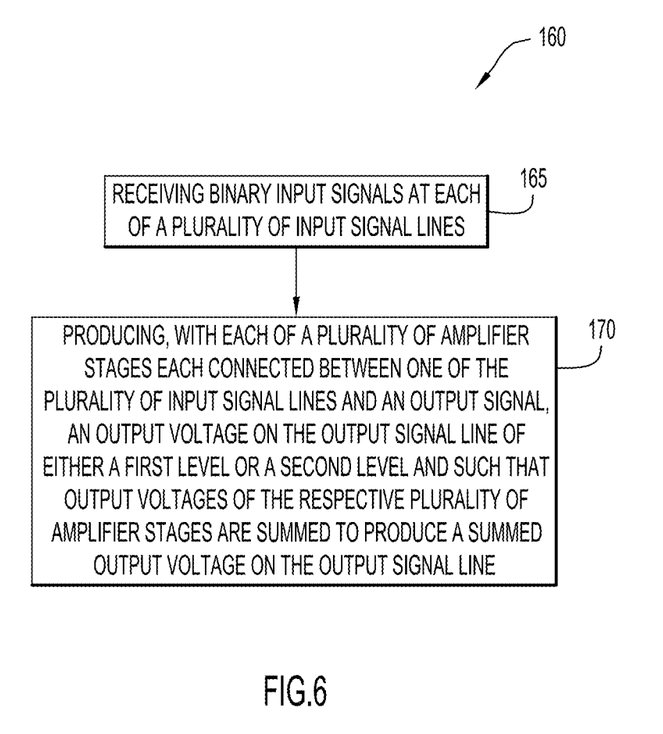
FIG. 6 is a high level flowchart of an example method for generating multi-level drive signals for an optical modulator according to techniques described herein.

FIG. 6 is a flowchart illustrating a generic method 160 that may be implemented in either MDR 25(1)/25(2) of FIG. 2 or MDR 106 of FIG. 4 to generate a multi-level drive signal at one of a plurality of different voltage levels. Method 160 begins at 165 where a binary input signal is received at each of a plurality of input signal lines. At 170, with each of a plurality of amplifier stages each connected between one of the plurality of input signal lines and an output signal, an output voltage is produced on the output signal line of either a first level or a second level such that the output voltages of the respective plurality of amplifier stages are summed to produce a summed output voltage on the output signal line.

In certain circumstances, the plurality of input signal lines comprise first and second input signal lines, and a first plurality of the amplifier stages are each connected between the first input signal line and the output signal line, and a second plurality of amplifier stages are each connected between the second input signal line and the output signal line. In such circumstances, the output voltage produced on the output signal line of either a first level or a second level at 170 further comprises producing first and second voltage levels such that the summed output voltage takes on one of four voltage levels.

In other circumstances, the plurality of amplifier stages comprises N-stages each connected between a separate input signal line and the output signal line. In such circumstances, producing an output voltage on the output signal line of either a first level or a second level at 170 further comprises producing first and second voltage levels such that the summed output voltage takes on one of N possible voltage levels.

Figure 7:
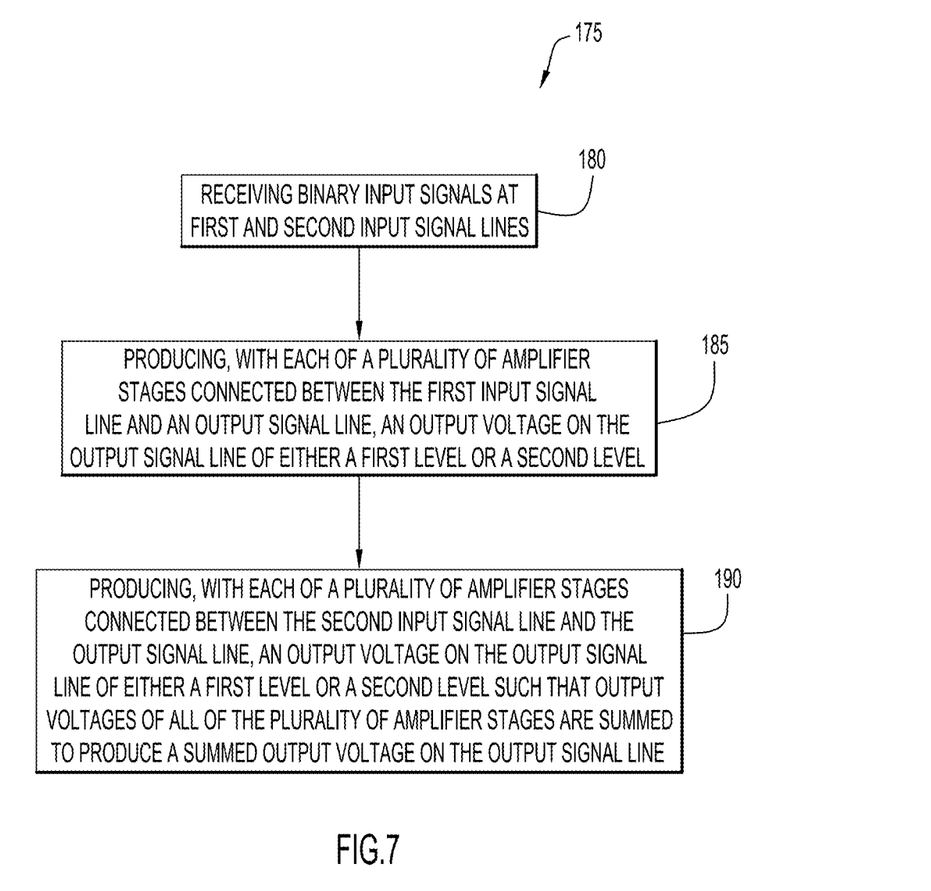
FIG. 7 is a flowchart of another example method for generating multi-level drive signals for an optical modulator according to techniques described herein.

FIG. 7 is a flowchart illustrating a method 175 that may be implemented by MDR 25 of FIG. 2 to generate a multi-level (i.e., four level) drive signal. Method 175 begins at 180 where binary input signals are received at first and second input signal lines. At 185, with each of a plurality of amplifier stages connected between the first input signal line and an output signal line, an output voltage is produced on the output signal line at either a first or a second level. At 190, with each of a plurality of amplifier stages connected between the second input signal line and the output signal line, an output voltage is produced on the output signal line at either a first or a second level such that the output voltages of all of the plurality of amplifier stages are summed to produce a summed output voltage on the output signal line. It is to be appreciated that the operations of 185 and 190 are not necessarily performed in order and that certain operations of 190 may be performed before operations of 185.

Figure 8:
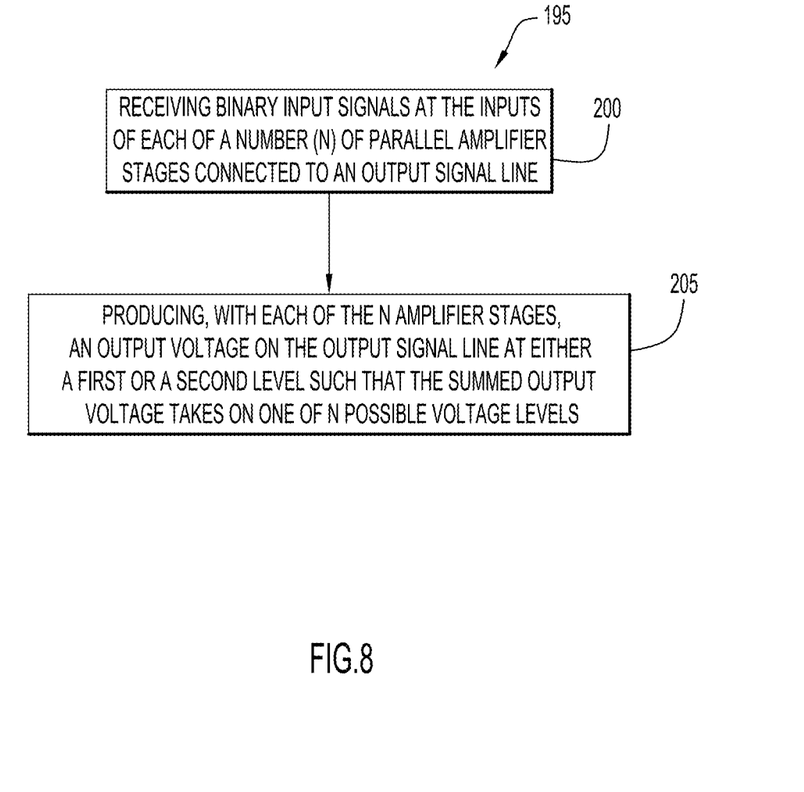
FIG. 8 is a flowchart a still other example method for generating multi-level drive signals for an optical modulator according to techniques described herein.

FIG. 8 is a flowchart illustrating a method 195 that may be implemented by MDR 106 of FIG. 4 to generate a multi-level drive signal at one of a plurality of possible voltage levels. Method 195 begins at 200 where binary input signals are received at the inputs of each of a number (N) of parallel amplifier stages connected to an output signal line. At 205, with each of a N amplifier stages, an output voltage is produced on the output signal line at either a first voltage level or a second voltage level such that the summed output voltage takes on one of N possible voltage levels.

The above description is intended by way of example only.

What is claimed is:

1. An apparatus comprising:
a plurality of input signal lines each configured to receive a binary input signal having a first value or a second value;
an output signal line; and
a plurality of amplifier stages each connected between one of the plurality of input signal lines and the output signal line and each configured to produce, based on the binary input signal at the respective input signal line, an output voltage on the output signal line of either a first level when the binary signal is at the first value or a second level when the binary signal is at the second value such that the output voltages of the respective plurality of amplifier stages collectively produce a summed analog output voltage on the output signal line at two or more discrete voltage levels each configured to drive an optical modulator,
wherein a number of the two or more discrete voltage levels of the summed analog output voltage depends on a number of the plurality of amplifier stages connected in parallel with each other,
wherein each of the plurality of input signal lines is connected to at least two of the plurality of amplifier stages, and
wherein each of the plurality of amplifier stages is made active or inactive based on a value of the binary input signal at the respective input signal line in order to produce the two or more discrete voltage levels.

2. The apparatus of claim 1, wherein the plurality of input signal lines comprise first and second input signal lines, and wherein a first plurality of the amplifier stages are each connected between the first input signal line and the output signal line, and wherein a second plurality of amplifier stages are each connected between the second input signal line and the output signal line such that the summed analog output voltage takes on one of four voltage levels.

3. The apparatus of claim 2, wherein each of the first plurality of amplifier stages and each of the second plurality of amplifier stages outputs a first voltage level so that the summed analog output voltage is at a first one of the four voltage levels and is equal to a sum of the first voltage level across the first plurality of amplifier stages and the second plurality of amplifier stages.

4. The apparatus of claim 2, wherein each of the first plurality of amplifier stages outputs a first voltage level and each of the second plurality of amplifier stages outputs a second voltage level so that the summed analog output voltage is at a second one of the four voltage levels and is equal to a sum of the first voltage level across the first plurality of amplifier stages and the second voltage level across the second plurality of amplifier stages.

5. The apparatus of claim 2, wherein each of the first plurality of amplifier stages outputs a second voltage level and each of the second plurality of amplifier stages outputs a first voltage level so that the summed analog output voltage is at a third one of the four voltage levels and is equal to a sum of the second voltage level across the first plurality of amplifier stages and the first voltage level across the second plurality of amplifier stages.

6. The apparatus of claim 2, wherein each of the first plurality of amplifier stages outputs a second voltage level and each of the second plurality of amplifier stages outputs a second voltage level so that the summed analog output voltage is at a fourth one of the four voltage levels and is equal to a sum of the second voltage level across the first plurality of amplifier stages and second plurality of amplifier stages.

7. The apparatus of claim 2, further comprising:
a compensation circuit coupled between both of the first and second input signal lines and the output signal line and configured to linearize the summed analog output voltage.

8. The apparatus of claim 7, wherein the compensation circuit comprises:
a plurality of transistors connected in series between the second input signal line and the output signal line.

9. The apparatus of claim 1, wherein the plurality of amplifier stages comprise N-amplifier stages each connected between a separate input signal line and the output signal line such that the two or more discrete voltage levels comprise N possible voltage levels.

10. The apparatus of claim 9, further comprising:
a control circuit configured to receive a multi-bit binary input signal and configured to convert the multi-bit binary input signal into a plurality of binary input signals for use by the N-amplifier stages.

11. The apparatus of claim 10, wherein the control circuit and the N-amplifier stages are implemented in one integrated circuit package.

12. The apparatus of claim 11, wherein the control circuit is implemented with a first semiconductor technology and the N-amplifier stages are implemented with a second semiconductor technology.

13. The apparatus of claim 1, further comprising an optical modulator configured to use the two or more output voltages on the output signal line to generate an optical signal carrying data for transmission in an optical fiber.

14. An integrated circuit device comprising multiple instances of the apparatus of claim 1.

15. The apparatus of claim 1, wherein each of the plurality of amplifier stages comprises:
at least two transistors connected in series between one of the plurality of input signal lines and the output signal line.

16. A method comprising:
receiving a binary input signal having a first value or a second value at each of a plurality of input signal lines; and
producing, with a plurality of amplifier stages each connected between one of the plurality of input signal lines and an output signal line, an output voltage on the output signal line of either a first level when the binary signal is at the first value or a second level when the binary signal is at the second value based on the binary signal at the respective input signal line, so that the output voltages of the respective plurality of amplifier stages collectively produce a summed analog output voltage on the output signal line at two or more discrete voltage levels each configured to drive an optical modulator,
wherein a number of the two or more discrete voltage levels of the summed analog output voltage depends on a number of the plurality of amplifier stages connected in parallel with each other,
wherein each of the plurality of input signal lines is connected to at least two of the plurality of amplifier stages, and
wherein each of the plurality of amplifier stages is made active or inactive based on a value of the binary input signal at the respective input signal line in order to produce the two or more discrete voltage levels.

17. The method of claim 16, wherein the plurality of input signal lines comprise first and second input signal lines, and wherein a first plurality of the amplifier stages are each connected between the first input signal line and the output signal line, and wherein a second plurality of amplifier stages are each connected between the second input signal line and the output signal line, and wherein producing an output voltage on the output signal line of either a first level or a second level comprises:
producing first or second voltage levels such that the summed analog output voltage takes on one of four discrete voltage levels.

18. The method of claim 17, further comprising:
outputting, with each of the first plurality of amplifier stages and each of the second plurality of amplifier stages, the first voltage level so that the summed analog output voltage is at a first one of the four voltage levels and is equal to a sum of the first voltage level across the first plurality of amplifier stages and the second plurality of amplifier stages.

19. The method of claim 17, further comprising:
outputting, with each of the first plurality of amplifier stages, the first voltage level;
outputting, with each of the second plurality of amplifier stages, the second voltage level so that the summed analog output voltage is at a second one of the four voltage levels and is equal to a sum of the first voltage level across the first plurality of amplifier stages and the second voltage level across the second plurality of amplifier stages.

20. The method of claim 17, further comprising:
outputting, with each of the first plurality of amplifier stages, the second voltage level; and
outputting, with each of the second plurality of amplifier stages, the first voltage level so that the summed analog output voltage is at a third one of the four voltage levels and is equal to a sum of the second voltage level across the first plurality of amplifier stages and the first voltage level across the second plurality of amplifier stages.

21. The method of claim 17, further comprising:
outputting, with each of the first plurality of amplifier stages and each of the second plurality of amplifier stages, the second voltage level so that the output analog summed voltage is at a fourth one of the four voltage levels and is equal to a sum of the second voltage level across the first plurality of amplifier stages and the second plurality of amplifier stages.

22. The method of claim 16, further comprising:
linearizing the summed analog output voltage.

23. The method of claim 16, wherein the plurality of amplifier stages comprises N-amplifier stages each connected between a separate input signal line and the output signal line, and wherein producing an output voltage on the output signal line comprises:
producing first and second voltage levels such that the summed analog output voltage takes on one of N possible voltage levels.

24. The method of claim 23, further comprising:
receiving, at a control circuit connected to each of the separate input signal lines, a multi-bit binary input signal; and
converting the multi-bit binary input signal into a plurality of binary input signals for use by the N-amplifier stages.

25. An apparatus comprising:
a plurality of input signal lines each configured to receive a binary input signal having a first value or a second value;
an output signal line; and
means for producing output voltages on the output signal line, each output voltage being at either a first level when the binary signal is at the first value or a second level when the binary signal is at the second value based on a binary input signal at the respective input signal lines so that the output voltages produced from binary input signals at the respective input signal lines are summed to produce a summed analog output voltage on the output signal line at two or more discrete voltage levels each configured to drive an optical modulator, wherein the means for producing includes a plurality of amplifier stages each connected between one of the plurality of input signal lines and the output signal line, and
wherein a number of the two or more discrete voltage levels of the summed analog output voltage depends on a number of the plurality of amplifier stages connected in parallel with each other, wherein each of the plurality of input signal lines is connected to at least two of the plurality of amplifier stages, and wherein each of the plurality of amplifier stages is made active or inactive based on a value of the binary input signal at the respective input signal line in order to produce the two or more discrete voltage levels.

26. The apparatus of claim 25, wherein a first plurality of the amplifier stages are each connected between the first input signal line and the output signal line, and wherein a second plurality of the amplifier stages are each connected between the second input signal line and the output signal line, so that the summed analog output voltage takes on one of four voltage levels.

27. The apparatus of claim 25, further comprising:
means for linearizing the summed analog output voltage.

28. The apparatus of claim 25, wherein the means for producing comprises N-amplifier stages, each amplifier stage connected between a separate input signal line and the output signal line so that the two or more discrete voltage levels comprise N possible voltage levels.

29. The apparatus of claim 28, further comprising:
means for converting a multi-bit binary input signal into a plurality of binary input signals for use by the N-amplifier stages.

* * * * *